Sept. 5, 1933.　　　　M. BERG　　　　1,925,169
BOOM ATTACHMENT FOR TRACTORS
Filed Nov. 26, 1930
FIG.1.
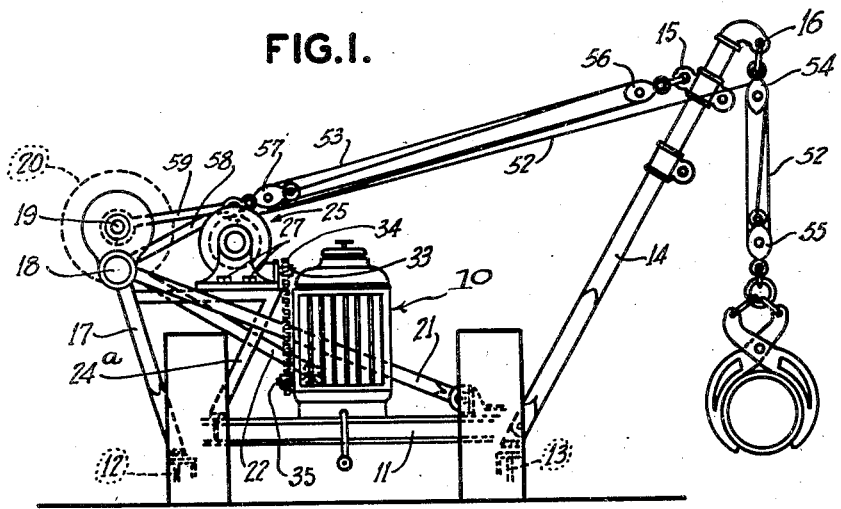
FIG.2.
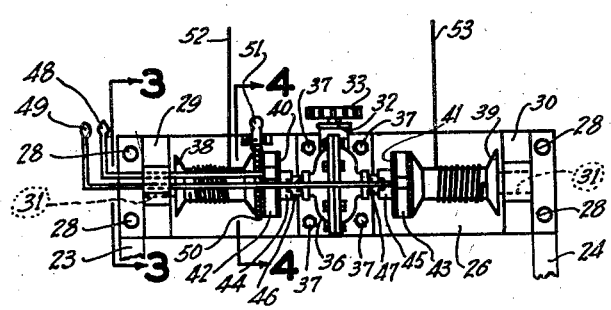
FIG.3.
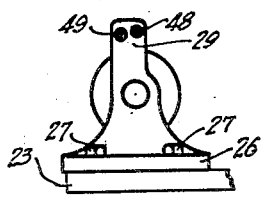
FIG.4.
INVENTOR
Magnus Berg
BY Loyal J. Miller
ATTORNEY Patented Sept. 5, 1933

1,925,169

UNITED STATES PATENT OFFICE 1,925,169

BOOM ATTACHMENT FOR TRACTORS

Magnus Berg, Cushing, Okla.

Application November 26, 1930
Serial No. 498,371

3 Claims. (Cl. 212—49)

My invention relates to hoisting booms for use on tractors and is more particularly an improvement over a device of which I am the inventor, and upon which a patent application was filed in the United States Patent Office, April 17, 1930, under Serial Number 444,899.

The objects of my invention are to provide a device of this class which is new, novel, practical and of utility; which will improve the above mentioned device by replacing the rigid boom adjusting means shown therein with cables controlled by a power transmission unit operated by the tractor engine; which will provide a means by which the transmission unit is supported upon the boom bracing members and acts as a counter balance to the weight of any object being handled by the boom; the transmission unit of which acts as a means of raising or lowering an object supported by the boom; which will be positive in action; which will be strong and durable; and, which will be efficient in accomplishing all the purposes for which it is intended.

With these and other objects in view as will more fully appear, my invention consists in the construction, novel features, and combination of parts hereinafter more fully described, pointed out in the claims hereto appended, and illustrated in the accompanying one-sheet drawing, of which:

Figure 1 is a front elevational view of a usual tractor showing the device installed thereon;

Fig. 2 is a top view of the power transmission unit;

Fig. 3 is an elevational view looking from the line 3—3 of Fig. 2; and,

Fig. 4 is a fragmentary horizontal sectional view taken along the lines 4—4 of Fig. 2.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawing is to be interpreted as being illustrative and not restrictive.

One practical embodiment of the invention as illustrated in the drawing follows:

As may best be seen in Fig. 1, a tractor 10 having front axle 11 and side frame members 12 and 13 is shown. Said side 13 pivotally supports the lower end of a boom 14 which is provided with eyes 15 and 16. Said side 12 rigidly supports the lower end of a pair of upwardly and outwardly extending parallel supporting members one of which is shown as 17. Said supporting members support rigidly therebetween a horizontal rod 18 above which is supported by brackets or the like, not shown, a second horizontal rod 19. Said rod 19 in turn supports a plurality of removable counter balance weights 20. As a means of bracing said rods 18 and 19 against transverse movement, a plurality of braces 21 and 22 are rigidly attached at their upper ends to said rod 18 and the lower end of said brace 21 is rigidly attached to said front axle 11. The lower end of said brace 22 is rigidly attached to the rear portion of the tractor's frame.

The structure thus far described has been fully brought out in said application, Serial No. 444,899, and is not claimed in this application as new.

My invention rests in the following described structure as limited by the claims herein.

A pair of parallel horizontal members 23 and 24 are attached at one end of each to one of the supporting members which were previously described as supporting said horizontal rod 18. The other ends of said members 23 and 24 are each attached rigidly to a leg 24a which in turn is rigidly attached to said side member 12, and attached upon and extending between said horizontal members 23 and 24 is a transmission unit 25, best seen in Fig. 2.

Said unit 25 consists of a base 26 rigidly attached to said members 23 and 24 by a plurality of bolts 27 through a like plurality of perforations 28. Said base 26 at each end is provided with upstanding portions 29 and 30. Said portions 29 and 30 journal opposite ends of a line shaft 31, which is driven by a worm gear on a transverse drive shaft 32 provided on its outer end with a sprocket 33 which is in turn driven by a chain 34 and sprocket 35 connected to the tractor engine. Said worm gear and said shaft 32 are housed in a housing 36 bolted medially to said base 26 by bolts or the like 37.

Upon said shaft 31 and between said housing 36 and said upstanding portions 29 is provided rope drums 38 and 39. Said drums 38 and 39 are rotatably mounted on said shaft 31 and their adjacent ends are provided with brake drums 40 and 41 and brake bands 42 and 43 respectively. Said drums 38 and 39 are also provided rigidly with female clutch members 44 and 45 respectively, and said shaft 31 is provided with male clutch members 46 and 47 which are adapted to mesh within said clutch members 44 and 45, and are so mounted on shaft 31 that they constantly rotate with said shaft, but are also allowed a limited longitudinal movement thereon toward and away from said clutch members 44 and 45.

A pair of lever arms 48 and 49 are respectively provided for transmitting longitudinal movement to said clutch members 46 and 47 and are also adapted by rotation to tighten or loosen said brake bands 42 and 43 respectively. Due to the fact that applicant is claiming no invention to reside in the particular power transmission unit shown, it has not been deemed necessary to illustrate in detail the specific manner in which said lever arms 48 and 49 are connected respectively to said brake bands 42 and 43, and to said clutch members 46 and 47 respectively.

Either or both of said drums 40 and 41 may be provided with an exteriorly toothed portion 50 and a pivoted dog 51 for preventing said drum from rotating in one direction unless said dog 51 is released.

Said drums 40 and 41 are respectively provided with cables 52 and 53. Said cable 52 is connected through a pulley 54 in said eye 16 and another pulley or block 55 therebelow and acts as a means for supporting and raising or lowering any weight to be handled by said boom 14. Said cable 53 is threaded through a set of blocks 56 and 57 one of which is connected in said eye 15 on boom 14 and the other of which is attached to an eye in the top of said gear housing 36. Said cable 53 acts as a means of adjusting the angle at which said boom 14 is disposed with respect to said side member 13.

A pair of braces 58 and 59 are rigidly attached at one end to said housing 36 and at their other ends to said rods 18 and 19 respectively.

In operation, it may be seen that the movement of said drum 40 may be regulated by the movement of said lever arm 48 and that likewise said drum 41 may be controlled by said lever arm 49. It may also be seen that said transmission unit 25 acts as a counter balance for any weight being handled by said boom 14.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. In a boom attachment for motor vehicles, the combination with a pair of usual parallel horizontal side members of a vehicle each extending between the axles of the vehicle, a boom supported upon one of said side members, a counter balance weight supported on the other side member, and with means for bracing said weight to said boom, of a winch adapted to be driven by the engine of said vehicle and to operate said boom, and means for supporting said winch upon the one of said side members upon which the counter balance weight is supported so that the weight of the winch acts as a counter balance to said boom, said means including a pair of spaced horizontal beams, one end of each attached to one of the supports for said weight, a pair of legs each supporting the other end of one of said beams upon the one of said side members which supports said counter balance weight.

2. In a boom attachment for motor vehicles, the combination with a boom pivotally attached at its lower end directly to one horizontal member of the vehicle frame, a counter-balance weight supported upon and above the opposite horizontal frame member of said vehicle, and with means for bracing said weight to said mast supporting member, of a winch adapted to be driven by the vehicle motor and to operate said boom, and means for supporting said winch upon the side of said vehicle upon which said weight is supported so that the weight of said winch acts as a counter-balance to said boom, said means including a pair of parallel horizontal members, one end of each attached to one of the supports for said weight, a pair of legs each resting upon the horizontal member of the vehicle upon which the counter-balance weight is supported, each leg supporting one end of one of said parallel members.

3. In a boom attachment for motor vehicles, the combination with a tractor having a low longitudinal side frame member extending between its axles at each of its sides, one side of said tractor supporting a boom, of means partially carried by the other one of said members for supporting a winch, said means including a pair of spaced upstanding legs carried by the last above mentioned member, a pair of horizontal beams each having one end supported by one of said legs, and a second pair of legs upstanding from other portions of the tractor adjacent the last above mentioned side frame member, the last mentioned legs supporting the ends of the horizontal beams.

MAGNUS BERG.